(12) United States Patent
Negi

(10) Patent No.: US 12,242,461 B2
(45) Date of Patent: Mar. 4, 2025

(54) DOCUMENT TRANSMISSION FOR OFFLINE EDITING

(71) Applicant: SAP SE, Walldorf (DE)

(72) Inventor: Pravesh Negi, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/071,889

(22) Filed: Nov. 30, 2022

(65) Prior Publication Data

US 2024/0176771 A1     May 30, 2024

(51) Int. Cl.
   *G06F 16/23*     (2019.01)
   *G06F 16/28*     (2019.01)
   *G06F 40/174*    (2020.01)

(52) U.S. Cl.
CPC ........ *G06F 16/2372* (2019.01); *G06F 16/283* (2019.01); *G06F 40/174* (2020.01)

(58) Field of Classification Search
CPC ... G06F 16/2372; G06F 16/283; G06F 40/174
See application file for complete search history.

(56) References Cited

U.S. PATENT DOCUMENTS

| | | | | |
|---|---|---|---|---|
| 10,467,298 | B2 * | 11/2019 | Mullins | G06F 16/316 705/35 |
| 10,565,300 | B2 * | 2/2020 | Kloiber | G06F 16/958 705/35 |
| 2007/0244775 | A1 * | 10/2007 | Linder | G06Q 40/00 705/35 |
| 2017/0315979 | A1 * | 11/2017 | Boucher | G06F 16/316 705/35 |
| 2020/0394359 | A1 * | 12/2020 | Fitzgerald | G06F 40/151 705/35 |
| 2021/0012103 | A1 * | 1/2021 | Bassu | G06F 16/288 707/999.003 |

* cited by examiner

*Primary Examiner* — Yuk Ting Choi
(74) *Attorney, Agent, or Firm* — Mintz Levin Cohn Ferris Glovsky and Popeo, P.C.

(57) ABSTRACT

A method, a system, and computer program product for offline document editing. A request to download a document stored at a remote database is received. The document is accessible through an online application. A structure of the document is generated by using metadata associated with the document. The document is generated by filling entries of the structure using data retrieved from the remote database. The document is transmitted to be downloaded for offline editing. An updated document generated by modifying the document using offline editing is received. The remote database is updated using the updated document.

16 Claims, 5 Drawing Sheets

DOCUMENT TRANSMISSION FOR OFFLINE EDITING

TECHNICAL FIELD

The subject matter described herein generally relates to offline editing of documents and more specifically to document transmission for offline editing of large documents.

BACKGROUND

The operations of an enterprise can involve generation and editing of a variety of electronic documents including, for example, purchase orders, sales contracts, licensing agreements, and/or the like. Each electronic document can include structured data, for example, in the form of key value pairs. The key in a key value pair can be a string value identifying a corresponding value. Meanwhile, the value in a key value can be any type of data including, for example, a string, an array, a Boolean value, a number, an object, and/or the like. An electronic document can include thousands of dimensions, such as rows and columns. The large dimensions of the documents can lead to complexities related to online editing and can burden servers during extensive periods of time.

SUMMARY

Systems, methods, and articles of manufacture, including computer program products, are provided for offline document editing. In one aspect, there is provided a computer-implemented method including: receiving, by one or more processors, a request to download a document stored at a remote database, the document being accessible through an online application, generating, by the one or more processors, a structure of the document by using metadata associated with the document, generating, by the one or more processors, the document by filling entries of the structure using data retrieved from the remote database, transmitting, by the one or more processors, the document to be downloaded for offline editing, receiving, by the one or more processors, an updated document generated by modifying the document using offline editing, and updating, by the one or more processors, the remote database using the updated document.

In some variations, one or more of the features disclosed herein including the following features can optionally be included in any feasible combination. The request includes a document identifier and the metadata associated with the document is retrieved using the document identifier.

In some variations, generating, by the one or more processors, the structure of the document includes using annotations associated with the document.

In some variations, the computer-implemented method further includes: generating, by the one or more processors, an updated structure of the updated document by using updated metadata associated with the updated document, reading, by the one or more processors, updated entries of the updated document using the updated structure, and updating, by the one or more processors, the remote database using the updated entries of the updated document.

In some variations, updating, by the one or more processors, the remote database using the updated entries of the updated document uses a service interface configured to provide access to the remote database.

In some variations, each of the document and the updated document include a multidimensional object.

In some variations, the offline editing includes modifying a dimension of the multidimensional object.

In another aspect, there is provided a non-transitory computer-readable storage medium including programming code, which when executed by at least one data processor, causes operations including: receiving a request to download a document stored at a remote database, the document being accessible through an online application, generating a structure of the document by using metadata associated with the document, generating the document by filling entries of the structure using data retrieved from the remote database, transmitting the document to be downloaded for offline editing, receiving an updated document generated by modifying the document using offline editing, and updating the remote database using the updated document.

In some variations, one or more of the features disclosed herein including the following features can optionally be included in any feasible combination. The request includes a document identifier and the metadata associated with the document is retrieved using the document identifier.

In some variations, generating, by the one or more processors, the structure of the document includes using annotations associated with the document.

In some variations, the computer-implemented method further includes: generating, by the one or more processors, an updated structure of the updated document by using updated metadata associated with the updated document, reading, by the one or more processors, updated entries of the updated document using the updated structure, and updating, by the one or more processors, the remote database using the updated entries of the updated document.

In some variations, updating, by the one or more processors, the remote database using the updated entries of the updated document uses a service interface configured to provide access to the remote database.

In some variations, each of the document and the updated document include a multidimensional object.

In some variations, the offline editing includes modifying a dimension of the multidimensional object.

In another aspect, there is provided a system including: at least one data processor, and at least one memory storing instructions, which when executed by the at least one data processor, cause operations including: receiving a request to download a document stored at a remote database, the document being accessible through an online application, generating a structure of the document by using metadata associated with the document, generating the document by filling entries of the structure using data retrieved from the remote database, transmitting the document to be downloaded for offline editing, receiving an updated document generated by modifying the document using offline editing, and updating the remote database using the updated document.

In some variations, one or more of the features disclosed herein including the following features can optionally be included in any feasible combination. The request includes a document identifier and the metadata associated with the document is retrieved using the document identifier.

In some variations, generating, by the one or more processors, the structure of the document includes using annotations associated with the document.

In some variations, the computer-implemented method further includes: generating, by the one or more processors, an updated structure of the updated document by using updated metadata associated with the updated document, reading, by the one or more processors, updated entries of the updated document using the updated structure, and updating, by the one or more processors, the remote database using the updated entries of the updated document.

In some variations, updating, by the one or more processors, the remote database using the updated entries of the updated document uses a service interface configured to provide access to the remote database.

In some variations, each of the document and the updated document include a multidimensional object.

In some variations, the offline editing includes modifying a dimension of the multidimensional object.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a non-transitory computer-readable or machine-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the generation of a user interface for accessing one or more software applications, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Implementations of the present disclosure are generally directed to offline editing of documents. More particularly, implementations of the present disclosure are directed to transmission of large documents (e.g., documents including thousands of dimensions) for offline editing. Large documents can be used for operations of an enterprise. For instance, a contract can be a type of document that includes structured data in the form of clauses, terms, and/or line items. Some entities can rely on document management software to manage documents throughout a multistage document lifecycle, which can include, for example, creation, execution, storage, and/or disposition of large documents. Conventional document management software can allow online document editing, as the documents progress through various stages of its lifecycle (e.g., creation, execution, storage, and/or disposition) even when the document size can burden the server. The offline editing described herein improves the document editing efficiency by, providing recommendations regarding the download of a document that reached a set size identified as optimal for offline editing. Another advantage of the offline editing described herein is the use of a downloading process and an uploading mechanism that increase the downloading speed and the uploading speed, respectively, while decreasing the burden on the server system and on the network supporting the data transmission.

Figure 1:
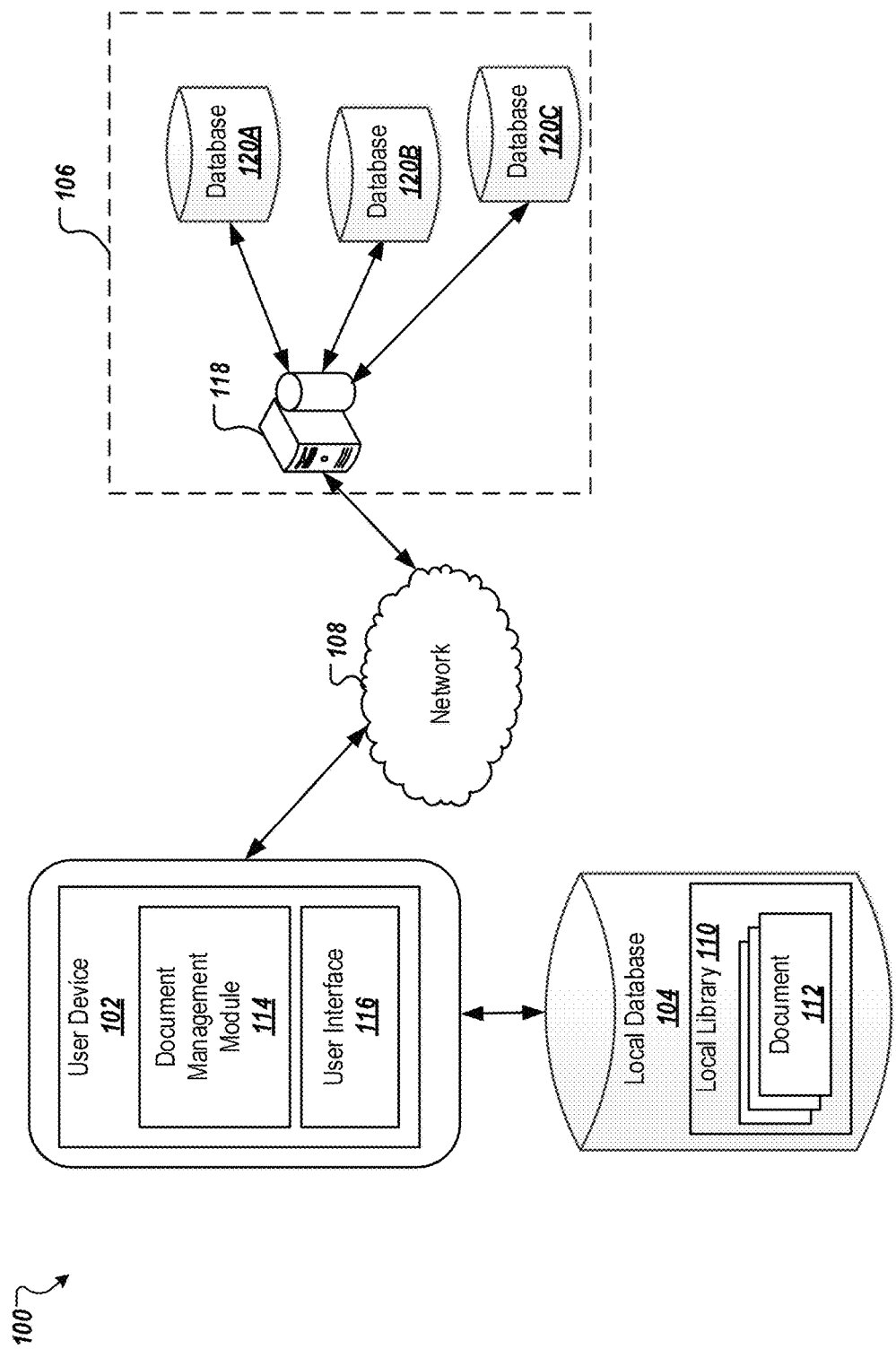
FIG. 1 depicts an example architecture that can be used to execute implementations of the present disclosure.

FIG. 1 depicts an example architecture 100 that can be used to execute implementations of the present disclosure. In the depicted example, the example architecture 100 includes a user device 102, a local database 104, a server system 106 and a network 108. The server system 106 includes one or more server device 118. As shown in FIG. 1, the user device 102 can be coupled with a local database 104, which can be any type of database including, for example, a relational database, a non-structured query language (NoSQL) database, an in-memory database, a graph database, and/or the like. The local database 104 can store a local library 110 that can include a document 112 that can be edited offline. The document 112 can be stored by the local library 110 as a multidimensional file, such as an excel file. The excel file can allow users to edit the document 112, such as modify dimensions (rows and/or columns within a single or multiple tabs), add items to one or more dimensions of the document 112, and/or modify data type within particular dimensions of the document 112. The document 112 can include any type of electronic document including structured data, for example, in the form of key value pairs. The key in a key value pair can be a string value identifying a corresponding value. Meanwhile, the value in a key value can be any type of data including, for example, a string, an array, a Boolean value, a number, an object, and/or the like. The document 112 can be temporary stored in a local library to enable offline editing and retrieved from a database 120A, 120B, 120C based on the underlying structured data.

In the depicted example, the user device 102 includes a document management module 114 and a user interface 116. The document management module 114 can interact with a server system 106 to edit large documents. For example, the document management module 114 can be configured to enable transmission of user authentication information and document transmission requests to enable editing of large documents. The user interface 116 can enable an entry of a user input including the user authentication information, document selection, and offline editing of large documents.

The user device 102 can be and/or include any type of processor and memory based device, such as, for example, cellular phones, smart phones, tablet computers, laptop computers, desktop computers, workstations, personal digital assistants (PDA), network appliances, cameras, enhanced general packet radio service (EGPRS) mobile phones, media players, navigation devices, email devices, game consoles, or an appropriate combination of any two or more of these devices or other data processing devices. Even though, not illustrated, in some implementations, multiple client devices 102 including different computing system configurations, such as different operating systems, different processing capabilities, different hardware components, and/or other differences can concurrently request services, during authenticated sessions, from the server system 106. The user device 102 can include any combination of fixed and variable computing components.

As shown in FIG. 1, the user device 102 can be communicatively coupled, via the network 108, with the server system 106 during an authenticated session to edit documents. It should be appreciated that the network 108 can be any wired and/or wireless network including, for example, a public land mobile network (PLMN), a local area network (LAN), a wide area network (WAN), the Internet, a cellular network, a telephone network (e.g., PSTN) or an appropriate combination thereof connecting any number of communication devices, mobile computing devices, fixed computing devices, server systems, and/or the like.

The server system 106 can include a server device 118 and a plurality of databases 120A, 120B, 120C configured to store documents 112 (e.g., large documents with thousands of dimensions) for long term and document models indicative of respective document structures. In the example of FIG. 1, the server device 118 are intended to represent various forms of servers including, but not limited to a web server, an application server, a proxy server, a network server, and/or a server pool. In general, the server system 106 accepts requests for application services, such as document transmission for editing services, and provides such services to any number of user devices (e.g., the user device 102) over the network 108. The server system 106 can be running instances of the corresponding executables (e.g., .exe files) included in a kernel of the databases 120A, 120B, 120C. It should be appreciated that the kernel of the databases 120A, 120B, 120C can also include other executable (e.g., .exe files) required for running the server device 118. In some implementations, an executable can be a computer program that have already been compiled into machine language (e.g., binary code) and is therefore capable of being executed directly by a data processor. As shown in FIG. 1, the databases 120A, 120B, 120C can be a dedicated, single-container database system running a single instance of the server system 106. However, where the databases 120A, 120B, 120C implement a multitenant database architecture (e.g., multitenant database containers (MDC)), each tenant of the server system 106 can be served by separate instances of the server system 106.

The databases 120A, 120B, 120C can include a cloud database system environment, such as, Analytics Cloud (SAC) Data Warehouse Cloud or High performance Analytic Appliance (HANA), as available from SAP AG, Walldorf, Germany although other types of databases can be used as well. In some implementations, the databases 120A, 120B, 120C can include an on-premise database system (e.g., system databases, tenant databases, etc.), servers (e.g., name server(s), index server(s), script server(s), etc.).

The databases 120A, 120B, 120C can be accessible (e.g., via queries, procedure calls, etc.) by the user device 102. The databases 120A, 120B, 120C can include a runtime database that holds most recent document annotations) and stores the documents in a database specific structure in parallel with respective metadata. The user device 102 can include an application (document management module 114) that uses the runtime database to provide definitions of the documents (tables, views, and other application data structures) that can be created on the databases 120A, 120B, 120C as metadata.

In accordance with implementations of the present disclosure, the server system 106 can host a document transmission service (e.g., document download from an identified database 120A, 120B, 120C to a user device 102 and document upload from the user device 102 to an identified database 120A, 120B, 120C). For example, input data (a request to download a document stored at a remote database and accessible through an online application) can be provided to the server device 118 (e.g., from the user device 102). The server device 118 can use a document identifier mapping to identify a storage location corresponding to one of the database 120A, 120B, 120C that stores the document identified by the user device 102. The server device 118 can process information characterizing the document (e.g., document size) to determine efficiency of online and offline document editing. If the server device 118 determines that offline document editing is more efficient than online document editing, the server device 118 can initiate a downloading process. The server device 118 can retrieve a document model and entries of a document structure from an identified database 120A, 120B, 120C to enable the user device 102 to download the document by using its structure. For example, the server device 118 can send the entries to the user device 102 over the network 108 to enable document reconstruction for offline editing on the user device 102. The server device 118 can receive a user input from the user device 102 indicating that offline document editing is completed. The server device 118 can initiate an uploading process to build the document structure and update the document entries in the respective database 120A, 120B, 120C that stores the document edited offline by the user device 102.

In some implementations, the server device 118 can include a machine learning model to increase an accuracy of differentiation between efficiency of online and offline document editing. The machine learning model can include mappings between attributes associated with the document and document structures that are included in the document selected for editing. The machine learning model can use training data to recognize correlations between the structure of a document (e.g., number of dimensions, data types, and/or the like) and the attributes of the document (e.g., transaction, entity, industry, commodity, region, date, and/or the like). For instance, the machine learning model can be trained to recognize, for example, that a document with a number of dimensions (e.g., larger than a threshold number of rows and/or threshold number of columns) should be downloaded from the database 120A, 120B, 120C to the user device 102 for offline editing. The machine learning model can use training data to recognize correlations between document types with particular attributes and content editing, for accelerating retrieval of document entries for increasing a speed of download and upload processes. For example, training data used to train the machine learning model can include external intelligence, which the server device 118 can retrieve from a plurality of external sources including, for example, a database 120A, 120B, 120C coupled with a content server. The external intelligence can include, for example, current events, market data, government rules and/or regulations, and/or the like. In some example implementations, the training data can include mappings between the external intelligence and the contents of a document. For example, the external intelligence can include government rules and/or regulations that necessitate the inclusion of a warranty clause in a document. Alternatively and/or additionally, the external intelligence can include market data (e.g., commodity market data, stock market data, and/or the like) that necessitates changing a pricing term and/or a time term in a document through offline editing. As such, training the machine learning model using training data that further includes the external intelligence can enable the machine learning model to recognize correlations between the content of a document (e.g., clauses, terms, line items, and/or the like), the attributes of the document (e.g., transaction, entity, industry, commodity, region, date, and/or the like), and external factors relevant to the document including for example, current events, market data, government rules and/or regulations, and/or the like, which can be used to accelerate download processes and upload processes by preloading relevant document entries (e.g., in a cache) for rapid transmission to the user device 102.

Figure 2A:
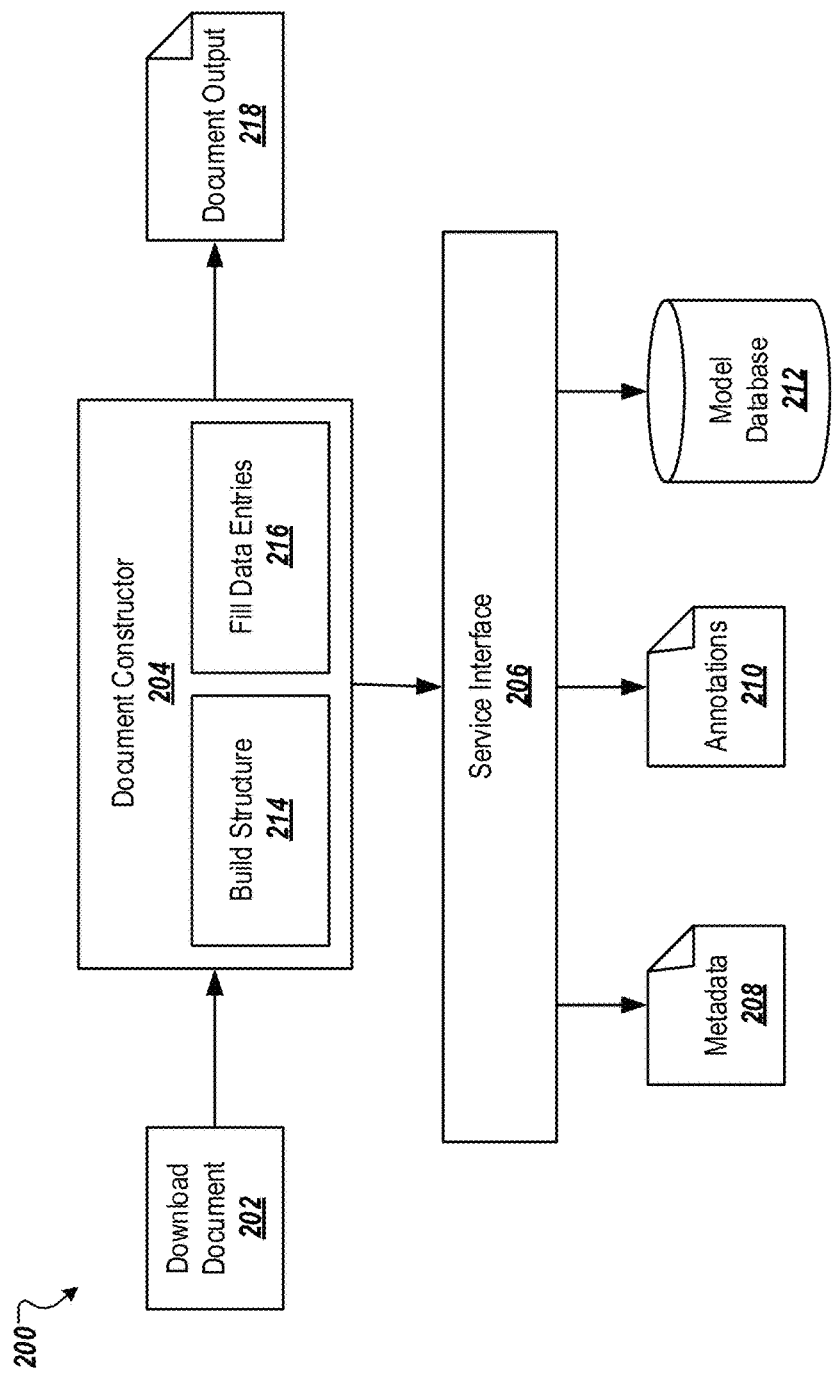
FIGS. 2A and 2B illustrate flow diagrams of examples of document transmissions, in accordance with some example implementations.
Figure 2B:
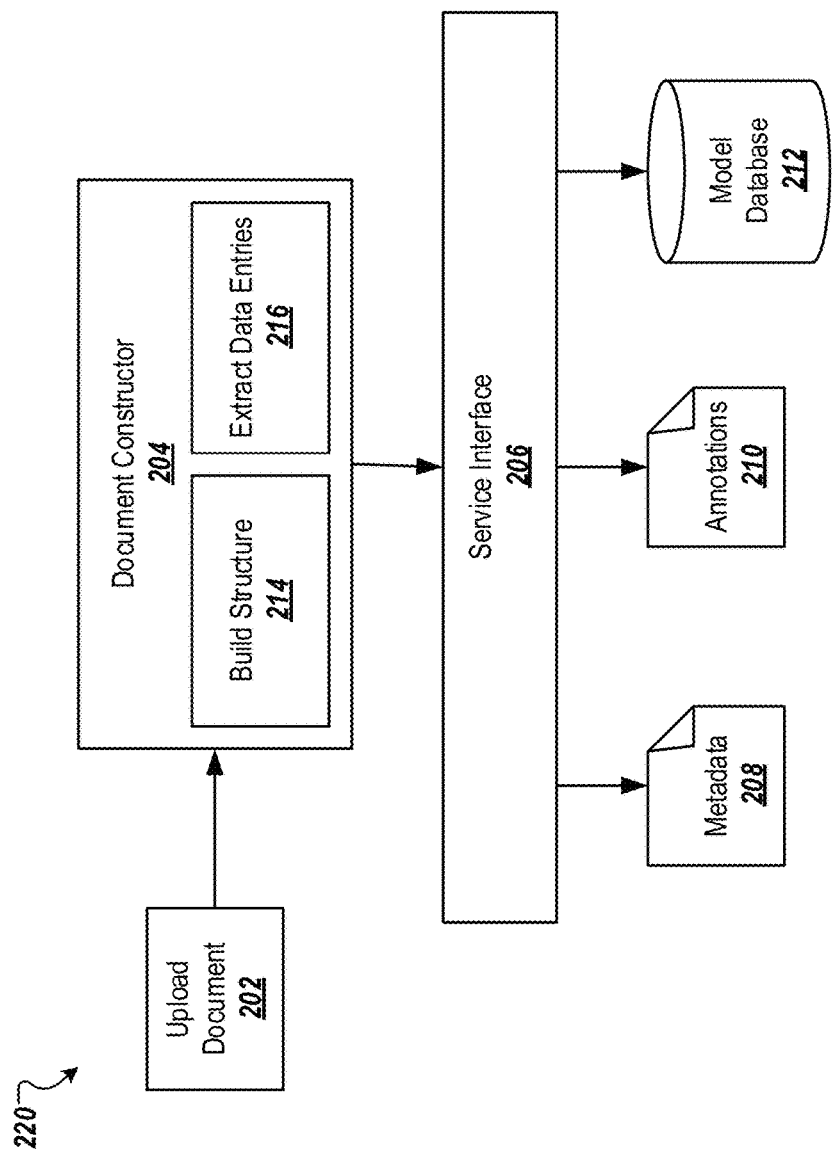

FIGS. 2A and 2B illustrate example architectures 200 and 220 for download processes and upload processes, respectively associated with offline document editing, in accordance with some example implementations. Referring to FIG. 2A, the example architecture 200 used for an example download process associated with offline document editing can be initiated by a user device (e.g., the user device 102 described with reference to FIG. 1) or a server device (e.g., the server device 118 described with reference to FIG. 1) that generates a request to download a document 202.

The request to download a document 202 can be transmitted to a document constructor 204. The document constructor 204 can be included in a user device (e.g., the user device 102 described with reference to FIG. 1) or a server device (e.g., the server device 118 described with reference to FIG. 1). The document constructor 204 can communicate with the service interface 206 to retrieve metadata 208, annotations 210, and a model from a model database 212 (e.g., the database 120A, 120B, 120C, described with reference to FIG. 1).

The document constructor 204 can be configured to process the metadata 208, the annotations 210, and the model to build a document structure 214. The document constructor 204 can fill data entries 216 in the generated document structure 214 to generate a document output 218. The document output 218 can include an excel file with a structure defining a single sheet (tab) or multiple sheets, each sheet having a particular dimension (including multiple rows and columns). Each document output 218 can correspond to a single excel file sheet or could have corresponding sheets in an excel file. The excel file format (structure and dimensions) can match a respective document model of the model database 212. The model of a document can be constant in an application of a server system (e.g., the server system 106 described with reference to FIG. 1). The model of a document can define the structure, content and semantics of the documents. The model of a document can include a set of model components. A model component can include a building block that make up the abstract data model of a document schema. Schemas describe what types of nodes can appear in documents and which hierarchical relationships such nodes can have. A schema is typically represented by an extended context-free grammar. The extended context-free grammar can include a parse tree. The purpose of a document model is to define and describe documents by using model components to constrain and define the meaning, usage and relationships of the constituent parts of documents: data types, elements, the content, the attributes, and the entry values. The document models can also provide for the specification of additional document information, such as normalization and defaulting of attribute and element values. The model database 212 can include facilities for self-documentation of document models. The document model can be used to define, describe and catalogue document vocabularies for particular classes of documents.

In some implementations, the document constructor 204 can include a document editing engine including one or more machine learning models including, for example, regression models, instance-based models, regularization models, decision trees, Bayesian models, clustering models, associative models, neural networks, deep learning models, dimensionality reduction models, ensemble models, and/or the like. The document constructor 204 can retrieve the document information from the annotations 210 and combine the document information with the document model to build the structure 214 of the document output 218 (excel files). According to some example implementations, the machine learning model can be trained to detect relationships that can exist across the different matrices included in the training data. For example, the machine learning model can be trained to detect, amongst the mappings included in the training data, more complex relationships that can exist between the metadata 208 (information about the document) and the annotations 210 (e.g., attributes of a document, external factors, and the content of the document). In doing so, the document constructor 204 can utilize the trained machine learning model to identify, during the creation of the document as the document output 218, the document content as entries to be added to the structure (e.g., clauses, terms, line items and/or the like).

Referring to FIG. 2B, the example architecture 220 used for an example upload process associated with offline document editing can be initiated by a user device (e.g., the user device 102 described with reference to FIG. 1) that transmits an offline edited document to a server device (e.g., the server device 118 described with reference to FIG. 1) with a request to upload the offline edited document 202 for storage in a database (e.g., the database 120A, 120B, 120C described with reference to FIG. 1).

The document constructor 204 can be configured to process the document received to be uploaded to build a document structure 214 and determine the data entries 216. The document constructor 204 can use the generated document structure 214 and the fill data entries 216 to generate an output for the service interface 206. The request to upload the offline edited document 202 can be transmitted to the document constructor 204. The document constructor 204 can be included in the user device (e.g., the user device 102 described with reference to FIG. 1) or the server device (e.g., the server device 118 described with reference to FIG. 1). The document constructor 204 can communicate with the service interface 206 to update the metadata 208 and the annotations 210 to match the offline edited document. For example, the service interface 206 can use the structure of the offline edited document (excel file), as identified by the document constructor 204, to update the annotations 210. In some implementations, the model of the document stored in the model database 212 can be stable throughout a document (excel file) lifecycle from download of the document (excel file) to upload of the document (excel file) after modifications introduced by offline editing.

Figure 3:
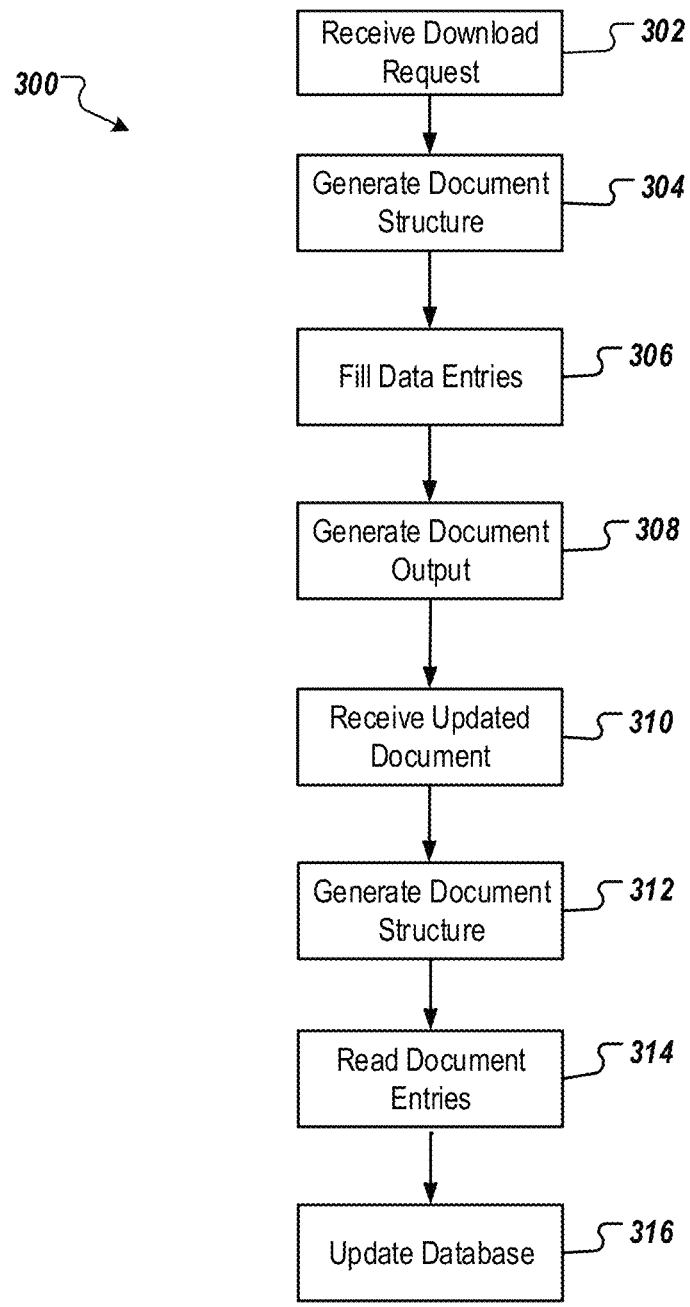
FIG. 3 depicts a flowchart illustrating an example of a process for offline document editing, in accordance with some example implementations.

FIG. 3 depicts an example process 300 for offline document editing, in accordance with some example implementations. The example process 300 can be executed by a computing device, such as the user device 102 or the server device 118 described with reference to FIG. 1 or a different computing device with limited processing capabilities.

At 302 a request to edit a document stored at a remote database and accessible through an online application is received. The request can be received by a computing system, such as a user device (e.g., user device 102 described with reference to FIG. 1), including an identifier (e.g., document name, document version) of the document to be accessed for editing. The documents can include structured documents (e.g., large multidimensional tables). A structured document can include a plurality of pre-defined fields. Examples of structured documents can include standardized multidimensional forms. In some implementations, the request to edit the document includes a request to download the document to a user device. In some implementations, a server device provides a recommendation to download the document based on a size of the document exceeding a set threshold size, to prevent loading the network during an editing session of the large document.

At 304 a structure of the document is generated, by using metadata and annotations associated with the document and a model of the document. The metadata can be retrieved using the document identifier. The metadata can include information about the document. For example, the metadata can include title, author, creation date, modification date, document size, and structure of the document (number of dimensions, sections, and data types). The annotations can be retrieved using the document identifier. The annotations can include attributes of a document, external factors, and the content of the document. For example, annotations can include semantic annotations, logical annotations, and layout annotations. The semantic annotations include document information describing content fragments/fields that concern the entire document. The semantic annotations can also include entities, which are low-granularity textual elements, such as index entry points, entity names, and other. The logical annotations include paragraphs, different types of lists, sections and subsections, images, formulas, multicolumn tables, etc. The layout annotations include font, highlighting such as bold and italics, and other formatting information. The document model can be used to define and describe documents by using model components to constrain and define the meaning, usage and relationships of the constituent parts of documents: data types, elements, the content, the attributes, and the entry values. The document models can also provide for the specification of additional document information, such as normalization and defaulting of attribute and element values.

At 306, data entries are filled in the identified document structure. The data entries can be retrieved from a storage location in a database using the document identifier and a mapping based on the document structure. In some implementations, the data entries are filled by a document constructor (e.g., document constructor 204 described with reference to FIGS. 2A and 2B). The document constructor can utilize a trained machine learning model to identify the entries to be added to the document structure as content (e.g., clauses, terms, line items and/or the like).

At 308, the document output is generated in a selected or predefined format (e.g., as an excel file) to be temporary stored at a local database (e.g., the local database 104 described with reference to FIG. 1). The document output can enable offline visualization and offline editing of any of the cells in any dimension of the document. The offline visualization and offline editing of the document can be performed at a user device (e.g., the user device 102 described with reference to FIG. 1) without requiring a network connection with a server system. The offline editing can include restricted or unrestricted document editing, depending on the rights associated with the user of the user device. For restricted document editing only a portion of the document (e.g., associated with author rights of the user) can be editable. In unrestricted editing mode, any portion and feature of the document can be modified. For example, a dimension (number of rows and/or columns) of the document can be modified (increased or decreased), values of cells within a dimension can be updated (added, deleted, and/or modified), and data types (text, number, logical, or error) of a particular dimension can be updated to be changed from a first data type to a second data type. In response to offline editing of the document, the metadata and the annotations associated with the document are automatically updated and stored at the local database.

At 310, a request to upload an offline updated document is received. The updated document can include the document that was downloaded from a remote database and edited offline at the user device. The request can be received by the computing system, such as the user device (e.g., user device 102 described with reference to FIG. 1), including an identifier (e.g., document name, document version) of the updated document to be uploaded to the remote database that originally stored it, after completed editing.

At 312, a structure of the offline edited document is generated, by using metadata and annotations associated with the updated document and a model of the document. The metadata and the annotations can be retrieved, from the local database, using the document identifier. The document model, can be retrieved from the remote database, to define and describe documents by using model components to constrain and define the meaning, usage and relationships of the constituent parts of documents: data types, elements, the content, the attributes, and the entry values. The document models can also provide for the specification of additional document information, such as normalization and defaulting of attribute and element values.

At 314, data entries are read from the offline edited document according to the identified document structure. The data entries can be retrieved using a mapping based on the document structure. In some implementations, the data entries can be read by the document constructor (e.g., document constructor 204 described with reference to FIGS. 2A and 2B). The document constructor can utilize a trained machine learning model to identify the entries to be read according to the document structure, as described with reference to FIGS. 2A and 2B.

At 316 the document stored at the remote database, corresponding to the document identifier is updated to include the data entries read from the offline edited document. After the document stored at the remote database, is updated to include the changes entered during offline editing, the updated document is available to be read and/or edited for multiple entities, according to their access authorization level. The example process 300 provides multiple data processing advantages. For example, the offline editing described herein improves the document editing efficiency by, providing recommendations regarding the download of a document that reached a set size identified as optimal for offline editing. Another advantage of the offline editing described herein is the use of a downloading process and an uploading mechanism that increase the downloading speed and the uploading speed, respectively, while decreasing the burden on the server system and on the network supporting the data transmission.

Figure 4:
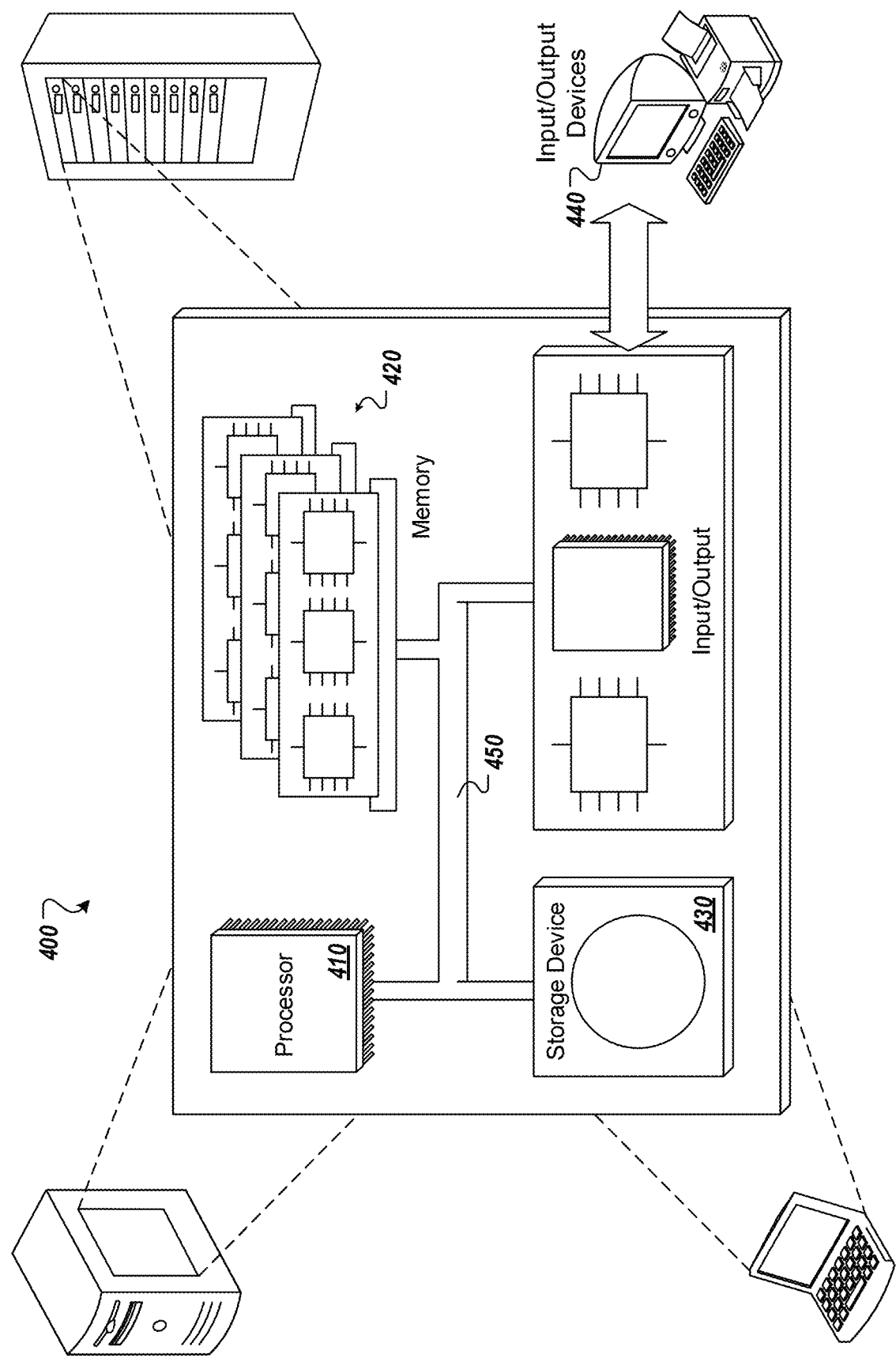
FIG. 4 depicts a block diagram illustrating a computing system, in accordance with some example implementations.

Referring now to FIG. 4, a schematic diagram of an example computing system 400 is provided. The system 400 can be used for the operations described in association with the implementations described herein. For example, the system 400 can be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 can be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing documents (data files); such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a user computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include users and servers. A user and server are generally remote from each other and typically interact through a network, such as the described one. The relationship of user and server arises by virtue of computer programs running on the respective computers and having a user-server relationship to each other.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

A number of implementations of the present disclosure have been described. Nevertheless, it will be understood that various modifications can be made without departing from the spirit and scope of the present disclosure. Accordingly, other implementations are within the scope of the following claims.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Further non-limiting aspects or implementations are set forth in the following numbered examples:

Example 1: A method, comprising: receiving, by one or more processors, a request to download a document stored at a remote database, the document being accessible through an online application; generating, by the one or more processors, a structure of the document by using metadata associated with the document; generating, by the one or more processors, the document by filling entries of the structure using data retrieved from the remote database; transmitting, by the one or more processors, the document to be downloaded for offline editing; receiving, by the one or more processors, an updated document generated by modifying the document using offline editing; and updating, by the one or more processors, the remote database using the updated document.

Example 2: The computer-implemented method of example 1, wherein the request comprises a document identifier and the metadata associated with the document is retrieved using the document identifier.

Example 3: The computer-implemented method of example 1 or 2, wherein generating, by the one or more processors, the structure of the document comprises using annotations associated with the document.

Example 4: The computer-implemented method of any one of examples 1 to 3, further comprises: generating, by the one or more processors, an updated structure of the updated document by using updated metadata associated with the updated document; reading, by the one or more processors, updated entries of the updated document using the updated structure; and updating, by the one or more processors, the remote database using the updated entries of the updated document.

Example 5: The computer-implemented method of any one of examples 1 to 4, wherein updating, by the one or more processors, the remote database using the updated entries of the updated document uses a service interface configured to provide access to the remote database.

Example 6: The computer-implemented method of any one of examples 1 to 5, wherein each of the document and the updated document comprise a multidimensional object.

Example 7: The computer-implemented method of any one of examples 1 to 6, wherein the offline editing comprises modifying a dimension of the multidimensional object.

Example 8: A non-transitory computer-readable storage medium comprising programming code, which when executed by at least one data processor, causes operations comprising: receiving a request to download a document stored at a remote database, the document being accessible through an online application; generating a structure of the document by using metadata associated with the document; generating the document by filling entries of the structure using data retrieved from the remote database; transmitting the document to be downloaded for offline editing; receiving an updated document generated by modifying the document using offline editing; and updating the remote database using the updated document.

Example 9: The non-transitory computer-readable storage medium of example 8, wherein the request comprises a document identifier and the metadata associated with the document is retrieved using the document identifier.

Example 10: The non-transitory computer-readable storage medium of example 8 or 9, wherein generating the structure of the document comprises using annotations associated with the document.

Example 11: The non-transitory computer-readable storage medium of any one of examples 8 to 10, wherein the operations further comprise: generating an updated structure of the updated document by using updated metadata associated with the updated document; reading updated entries of the updated document using the updated structure; and updating the remote database using the updated entries of the updated document.

Example 12: The non-transitory computer-readable storage medium of any one of examples 8 to 10, wherein updating the remote database using the updated entries of the updated document uses a service interface configured to provide access to the remote database.

Example 13: The non-transitory computer-readable storage medium of any one of examples 8 to 12, wherein each of the document and the updated document comprise a multidimensional object.

Example 14: The non-transitory computer-readable storage medium of any one of examples 8 to 13, wherein the offline editing comprises modifying a dimension of the multidimensional object.

Example 15: A system comprising: at least one data processor; and at least one memory storing instructions, which when executed by the at least one data processor, cause operations comprising: receiving a request to download a document stored at a remote database, the document being accessible through an online application; generating a structure of the document by using metadata associated with the document; generating the document by filling entries of the structure using data retrieved from the remote database; transmitting the document to be downloaded for offline editing; receiving an updated document generated by modifying the document using offline editing; and updating the remote database using the updated document.

Example 16: The system of example 15, wherein the request comprises a document identifier and the metadata associated with the document is retrieved using the document identifier.

Example 17: The system of example 15 or 16, wherein generating the structure of the document comprises using annotations associated with the document.

Example 18: The system of any one of examples 15 to 17, wherein the operations further comprise: generating an updated structure of the updated document by using updated metadata associated with the updated document; reading updated entries of the updated document using the updated structure; and updating the remote database using the updated entries of the updated document.

Example 19: The system of any one of examples 15 to 18, wherein updating the remote database using the updated entries of the updated document uses a service interface configured to provide access to the remote database.

Example 20: The system of any one of examples 15 to 19, wherein each of the document and the updated document comprise a multidimensional object, wherein the offline editing comprises modifying a dimension of the multidimensional object.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer-implemented method comprising:
   receiving, by one or more processors, a request to download a document stored at a remote database, the document being accessible through an online application;
   identifying, by the one or more processors, a data structure of the document using metadata associated with the document, annotations associated with the document, and a document model that is obtained from a model database, the document model describing and defining the document using model components;
   training, by the one or more processors, a machine learning model to:
      identify correlations between the metadata and the annotations,
      identify that if the document has more than a threshold number of dimensions, the document should be downloaded for offline editing, and
      identify if offline document editing for the document decreases burden on a server compared to online document editing based on the identified correlations;
   applying, by the one or more processors, the trained machine learning model to the document to enable populating of entries of the data structure of the document;
   populating, by the one or more processors using the trained machine learning model, entries of the data structure of the document with data retrieved from the remote database;
   based on the populating of the entries of the data structure of the document, generating, by the one or more processors, an output document in a selected format to be downloaded to a local database for offline editing;
   modifying the output document using the offline editing;
   receiving, by the one or more processors, a request to upload an offline updated document generated by the modifying of the output document using the offline editing; and
   updating, by the one or more processors, the remote database using the offline updated document,
   wherein each of the document and the offline updated document comprise a multidimensional object, and wherein the offline editing comprises modifying a dimension of the multidimensional object.

2. The computer-implemented method of claim 1, wherein the download request comprises a document identifier and the metadata associated with the document is retrieved using the document identifier.

3. The computer-implemented method of claim 1, wherein the annotations comprise one or more of: attributes of the document, external factors relevant to the document, and content of the document, and wherein the computer-implemented method further comprises training, by the one or more processors, the machine learning model to identify correlations between the content of the document and the attributes of the document.

4. The computer-implemented method of claim 1, further comprises:
   generating, by the one or more processors, an updated data structure of the offline updated document using updated metadata associated with the offline updated document;
   reading, by the one or more processors using the machine learning model, updated entries of the offline updated document using the updated data structure; and
   updating, by the one or more processors, the remote database using the updated entries of the offline updated document.

5. The computer-implemented method of claim 4, wherein updating, by the one or more processors, the remote database using the updated entries of the offline updated document uses a service interface configured to provide access to the remote database.

6. A non-transitory computer-readable storage medium comprising programming code, which when executed by at least one data processor, causes operations comprising:
   receiving a request to download a document stored at a remote database, the document being accessible through an online application;
   identifying a data structure of the document using metadata associated with the document, annotations associated with the document, and a document model that is obtained from a model database, the document model describing and defining the document using model components;
   training a machine learning model to:
      identify correlations between the metadata and the annotations,
      identify that if the document has more than a threshold number of dimensions, the document should be downloaded for offline editing, and
      identify if offline document editing for the document decreases burden on a server compared to online document editing based on the identified correlations;
   applying the trained machine learning model to the document to enable populating of entries of the data structure of the document;
   populating, using the trained machine learning model, entries of the data structure of the document with data retrieved from the remote database;
   based on the populating of the entries of the data structure of the document, generating an output document in a selected format to be downloaded to a local database for offline editing;
   modifying the output document using the offline editing;
   receiving a request to upload an offline updated document generated by the modifying of the output document using the offline editing; and
   updating the remote database using the offline updated document,
   wherein each of the document and the offline updated document comprise a multidimensional object, and wherein the offline editing comprises modifying a dimension of the multidimensional object.

7. The non-transitory computer-readable storage medium of claim 6, wherein the download request comprises a document identifier and the metadata associated with the document is retrieved using the document identifier.

8. The non-transitory computer-readable storage medium of claim 6, wherein the annotations comprise one or more of: attributes of the document, external factors relevant to the document, and content of the document, and wherein the operations further comprise training, by the at least one data processor, the machine learning model to identify correlations between the content of the document and the attributes of the document.

9. The non-transitory computer-readable storage medium of claim 6, wherein the operations further comprise:
    generating an updated data structure of the offline updated document using updated metadata associated with the offline updated document;
    reading, using the trained machine learning model, updated entries of the offline updated document using the updated data structure; and
    updating the remote database using the updated entries of the offline updated document.

10. The non-transitory computer-readable storage medium of claim 9, wherein updating the remote database using the updated entries of the offline updated document uses a service interface configured to provide access to the remote database.

11. A system comprising:
    at least one data processor; and
    at least one memory storing instructions, which when executed by the at least one data processor, cause operations comprising:
        receiving a request to download a document stored at a remote database, the document being accessible through an online application;
        identifying a data structure of the document using metadata associated with the document, annotations associated with the document, and a document model that is obtained from a model database, the document model describing and defining the document using model components;
        training a machine learning model to:
            identify correlations between the metadata and the annotations,
            identify that if the document has more than a threshold number of dimensions, the document should be downloaded for offline editing, and
            identify if offline document editing for the document decreases burden on a server compared to online document editing based on the identified correlations;
        applying the trained machine learning model to the document to enable populating of entries of the data structure of the document;
        populating, using the trained machine learning model, entries of the data structure of the document with data retrieved from the remote database;
        based on the populating of the entries of the data structure of the document, generating an output document in a selected format to be downloaded to a local database for offline editing;
        modifying the output document using the offline editing;
        receiving a request to upload an offline updated document generated by the modifying of the output document using the offline editing; and
        updating the remote database using the offline updated document,
        wherein each of the document and the offline updated document comprise a multidimensional object, and wherein the offline editing comprises modifying a dimension of the multidimensional object.

12. The system of claim 11, wherein the download request comprises a document identifier and the metadata associated with the document is retrieved using the document identifier.

13. The system of claim 11, wherein identifying the data structure of the document comprises using annotations comprise one or more of: attributes of the document, external factors relevant to the document, and content of the document, and wherein the operations further comprise training, by the at least one data processor, the machine learning model to identify correlations between the content of the document and the attributes of the document.

14. The system of claim 11, wherein the operations further comprise:
    generating an updated data structure of the offline updated document using updated metadata associated with the offline updated document;
    reading, using the trained machine learning model, updated entries of the offline updated document using the updated data structure; and
    updating the remote database using the updated entries of the offline updated document.

15. The system of claim 14, wherein updating the remote database using the updated entries of the offline updated document uses a service interface configured to provide access to the remote database.

16. The system of claim 11, wherein each of the document and the offline updated document comprise a multidimensional object, wherein the offline editing comprises modifying a dimension of the multidimensional object.

* * * * *